July 6, 1926.  
E. L. THOMAS  
SHOCK ABSORBER  
Filed July 9, 1925  
1,591,895
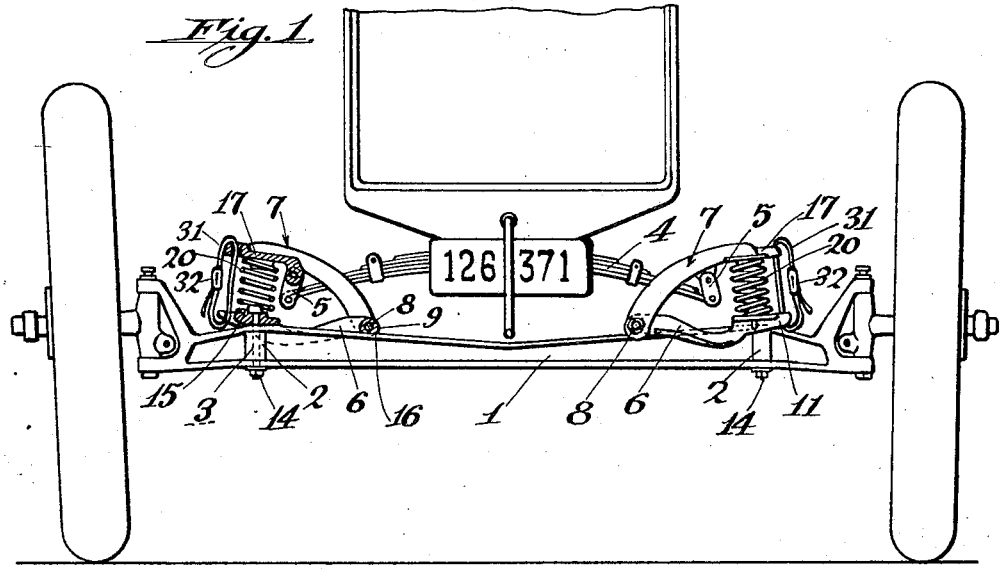
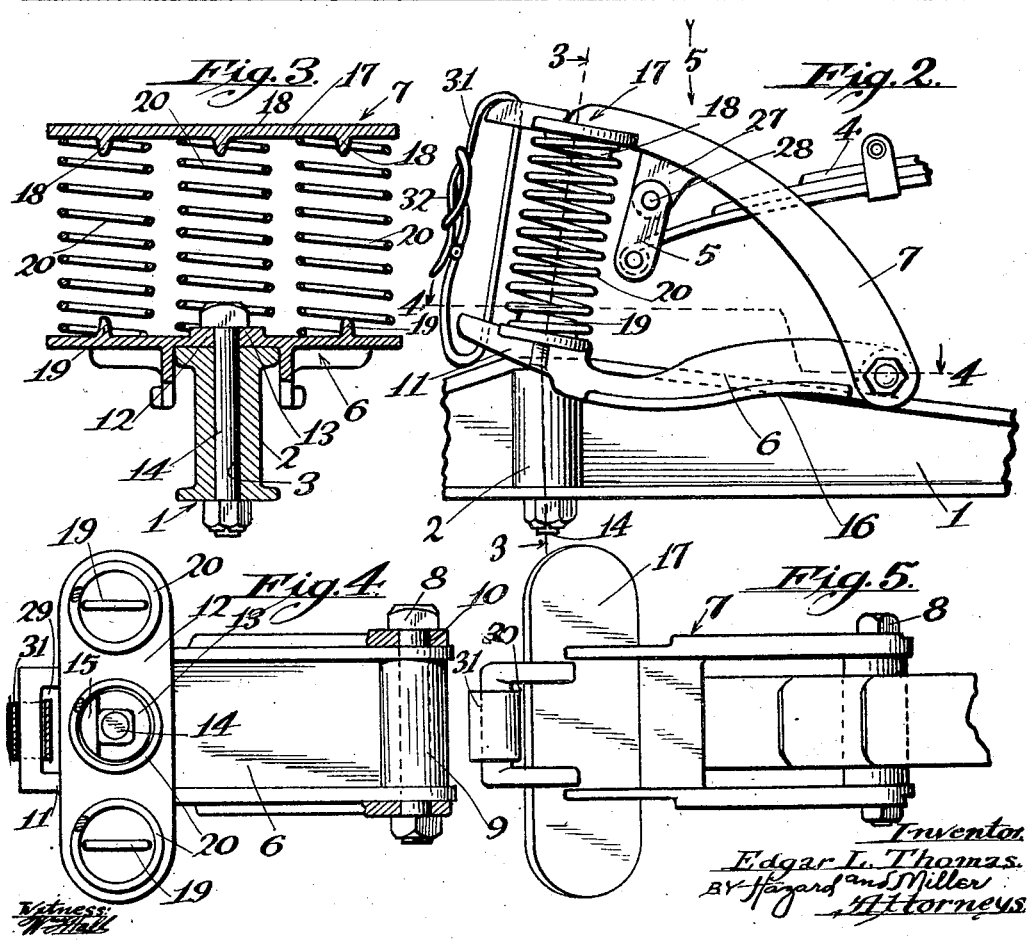
Inventor  
Edgar L. Thomas  
By Hazard and Miller  
Attorneys Patented July 6, 1926.

1,591,895

UNITED STATES PATENT OFFICE.

EDGAR L. THOMAS, OF SANTA BARBARA, CALIFORNIA.

SHOCK ABSORBER.

Application filed July 9, 1925. Serial No. 42,466.

My invention is a shock absorber which functions as an additional spring to effect easy action and with a snubber attached thereto. My shock absorber is particularly designed for use with transverse springs extending across an axle and is adapted to fit the usual construction of the axle and and spring suspension of the Ford automobile.

My shock absorber takes the place of the bracket connecting the spring shackles to the axle and is made in the form of a pair of hinged arms with a spring between the arms and the transverse spring of a Ford hung from a shackle on the upper arm. The lower arm is bolted in place on the axle by the bolt passing through the bolt hole of the spring perches and the lower arm extends substantially parallel to the axle and may have the outer end bearing on the axle if desired. The upper arm extends outwardly so that the helically coiled springs secured between the bases of the arms are substantially above the perch clamping bolts and slightly inclined thereto. A strap may be connected to the ends of the arms to prevent their swinging too wide apart, on a rebound.

My invention will be more readily understood from the following description and drawings in which:

Figure 1 is a front elevation of an automobile showing my shock absorber attached thereto. The illustration depicts the snubbers attached to the standard front axle and spring of the Ford automobile, one snubber being shown in longitudinal section and the other in elevation.

Fig. 2 is a front elevation of one of the snubbers indicating its attachment to a front axle.

Fig. 3 is a section on the line 3—3 of Fig. 2 in the direction of the arrows showing the mounting for the triple springs.

Fig. 4 is a section on the line 4—4 of Fig. 2 in the direction of the arrows.

Fig. 5 is a plan view of Fig. 2 in the direction of the arrow 5.

Referring particularly to Fig. 1, the axle of an automobile is designated by the numeral 1 having a seat 2 for the spring perch and a bolt hole 3 through which the perch may be bolted. The spring of the ordinary type is indicated by the numeral 4 and the ordinary spring shackles 5 may be used, thus only discarding the spring perch.

My snubber and combined shock absorber is illustrated more fully in Figs. 2 to 5 and has a lower arm 6 which is stationary and a swivelling upper arm 7 connected by a pivot pin 8 extending through a hub 9 and through an aperture 10 in the ends of the arm 7. The outer end 11 of the arm 6 is provided with a flat base 12 which at the center portion has a lug 13 extending thereabove and forming a square seat for the bolt 14 extending through the bolt hole 3 of the axle 2. This lug preferably has a raised extension 15 on one side to keep the bolt from turning. The hub is preferably slightly rounded on its lower side as indicated at 16 so that it may rest on the top of the axle.

The upper arm 7 is formed on a curve and has a bearing plate 17 formed adjacent the ends and preferably made integral with the arms. This bearing plate has a series of short ribs 18 similar to ribs 19 on the base 12 and these ribs are adapted to retain compression springs 20 in position. It is desirable to have the base 12 slightly inclined inwardly so that the springs 20 are not in a vertical line but inclined inwardly.

A boss 27 is preferably formed integral with the arms and depends downwardly therefrom. A hole is formed through the boss for the insertion of the shackle pin 28 to engage the spring shackles 5. As above described these shackles may be of the ordinary type and the arms 7 are spaced a sufficient distance apart so that the spring may extend freely through the space between the arms and have free action of swivelling on the shackles and the boss 27.

The arms at their extreme outer ends are formed with slots 29 and 30 in the lower and upper arms respectively through which is threaded a strap 31 having a buckle fastening 32.

The action of my shock absorber is substantially as follows:—The coil springs 20 may be made either relatively stiffer than the leaf spring 4 or else more resilient so as to compress under lighter loads. If the coil springs are stiffer most of the small jolts in ordinary running on fairly smooth pavement will be taken by the leaf springs and the severe jolts will cause the compression of both the leaf and the coil springs. On the rebound upwardly of the coil springs the strap 31 will prevent excessive movement and thereby eliminate a severe rebound.

Should the coil spring 20 be made less stiff than the leaf spring 4, most of the road jars from uneven pavement will be taken by the coil springs with comparatively little flexure of the leaf spring. However, on severe jolts both sets of springs will be compressed and again on the rebound the strap 31 will prevent an excessive upthrow.

While I have illustrated and described the springs as attached to the front axle of an automobile they may be attached in a somewhat similar manner to the rear axle, requiring but slight change in the design to secure the lower arm to the axle. It is manifest that the details of construction may be considerably changed to suit the shapes of axles or springs on different makes of automobiles and that the details of the spring mountings and types of spring used in my shock absorber may be materially changed without departing from the spirit of my invention.

With my construction of shock absorber, the base supporting the springs will be canted slightly to conform to the pitch given to the axle and by having the spring shackles positioned inward on the springs the standard automobile spring may be used without lengthening or shortening. The construction of the shock absorber functions to prevent or reduce the swaying in making a sharp turn or a turn at high speed.

Having described my invention, what I claim is:

1. A shock absorber comprising in combination a lower arm having a pair of side bars, a base secured to the outer end of said bars and being adapted to be bolted to the seat of the spring perch on an axle, the said side bars extending towards the center of the axle substantially parallel therewith, an upper arm pivotally connected to the inner end of the lower arm and comprising a pair of side bars, a bearing plate connecting the outer ends of said side bars, helical springs between the base and the bearing plate and a spring shackle swivelled to the upper arm, adapted to support a spring passing through the side bars of the upper arm.

2. A shock absorber, comprising in combination a lower arm having a pair of side bars, a base secured to the outer ends of said bars, means to rigidly bolt the base to the axle of a vehicle on the upper side thereof, an upper arm swivelly connected to the lower arm at the inner ends of said arm, the upper arm being formed of a pair of bars, a bearing plate at the outer end of the upper arm connecting the bars, coiled springs between the base and the bearing plate of the lower and upper arms, and means to operatively connect a vehicle spring to the upper arms.

3. The combination with a vehicle axle having a spring perch seat, of a shock absorber having a lower arm formed with side bars, the said side bars being adapted to extend parallel to the axle on each side thereof, a base secured to the outer ends of said arms, means to bolt the said base to the spring perch seat on the upper side of the axle, a hub on the inner end of the lower arm connecting the side bars and resting on the top of the axle, an upper arm having a pair of side bars, a bolt extending through the said hub, a bearing plate on the outer end of the said upper arm, connecting the side bars, a spring shackle swivelly connected to the side bars of the upper arm, and a spring extended between the said side bars and connected to the said shackle.

4. The combination with a vehicle axle, having a spring perch seat adjacent the outer end of the axle and an upper surface inclined toward the center of the axle, of a shock absorber having a lower arm with a pair of side bars, a base connecting the outer ends of said side bars, the base being tilted to conform substantially to the inclination of the axle, a hub connecting the inner end of the said side bars, said hub being adapted to rest on the axle, an upper arm having a pair of side bars, a bolt swivelly connecting said arms to the hub a bearing plate at the outer end of the upper arm between the side bars, compression springs between the bearing plate and the base, a boss connecting the side bars of the upper arm adjacent the bearing plate, a spring shackle swivelled thereto and a vehice spring extending between the side bars of the upper arm and connected to said shackle.

5. A shock absorber, comprising in combination a lower arm having a pair of side bars, a base secured to the outer ends of said bars and being tilted inwardly and from front to rear to conform to the pitch of an axle, a lug formed integral with the base and having a surface parallel to the base of the axle whereby a bolt may be passed through the lug, the base and the axle, a hub at the inner end of the bars having an aperture therethrough for a pivot pin, an upper arm having a pair of side bars pivotally connected to the pin and having a bearing plate connecting their outer ends, helical springs between the base and the bearing plate, a boss formed between the two bars of the upper arm, a spring shackle swivelled to said boss and a vehicle spring passing between the bars of the upper arm engaging spring shackles.

6. A shock absorber as claimed in claim 5, having in addition slots formed at the outer end of the lower and upper arms and a strap secured therethrough forming a rebound snubber.

In testimony whereof I have signed my name to this specification.

E. L. THOMAS.